Figure 1:
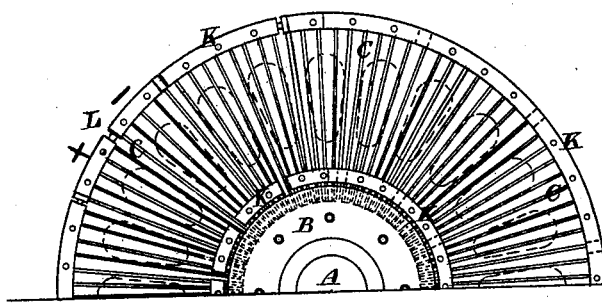

(No Model.) 4 Sheets—Sheet 1.

S. Z. DE FERRANTI & A. THOMPSON.
DYNAMO ELECTRIC MACHINE.

No. 282,446. Patented July 31, 1883.

Witnesses:
L. B. Wight
E. V. Brown,

Inventors:
S. Z. de Ferranti
Alfred Thompson
by their attorneys
Baldwin, Hopkins & Peyton.

(No Model.) 4 Sheets—Sheet 2.

S. Z. DE FERRANTI & A. THOMPSON.
DYNAMO ELECTRIC MACHINE.

No. 282,446. Patented July 31, 1883.

(No Model.) 4 Sheets—Sheet 3.

S. Z. DE FERRANTI & A. THOMPSON.
DYNAMO ELECTRIC MACHINE.

No. 282,446. Patented July 31, 1883.

Witnesses.
Nellie Holmes.
Eugene V. Brown.

Inventors:
S. Z. de Ferranti
Alfred Thompson
by their Attorneys
Baldwin, Hopkins & Peyton

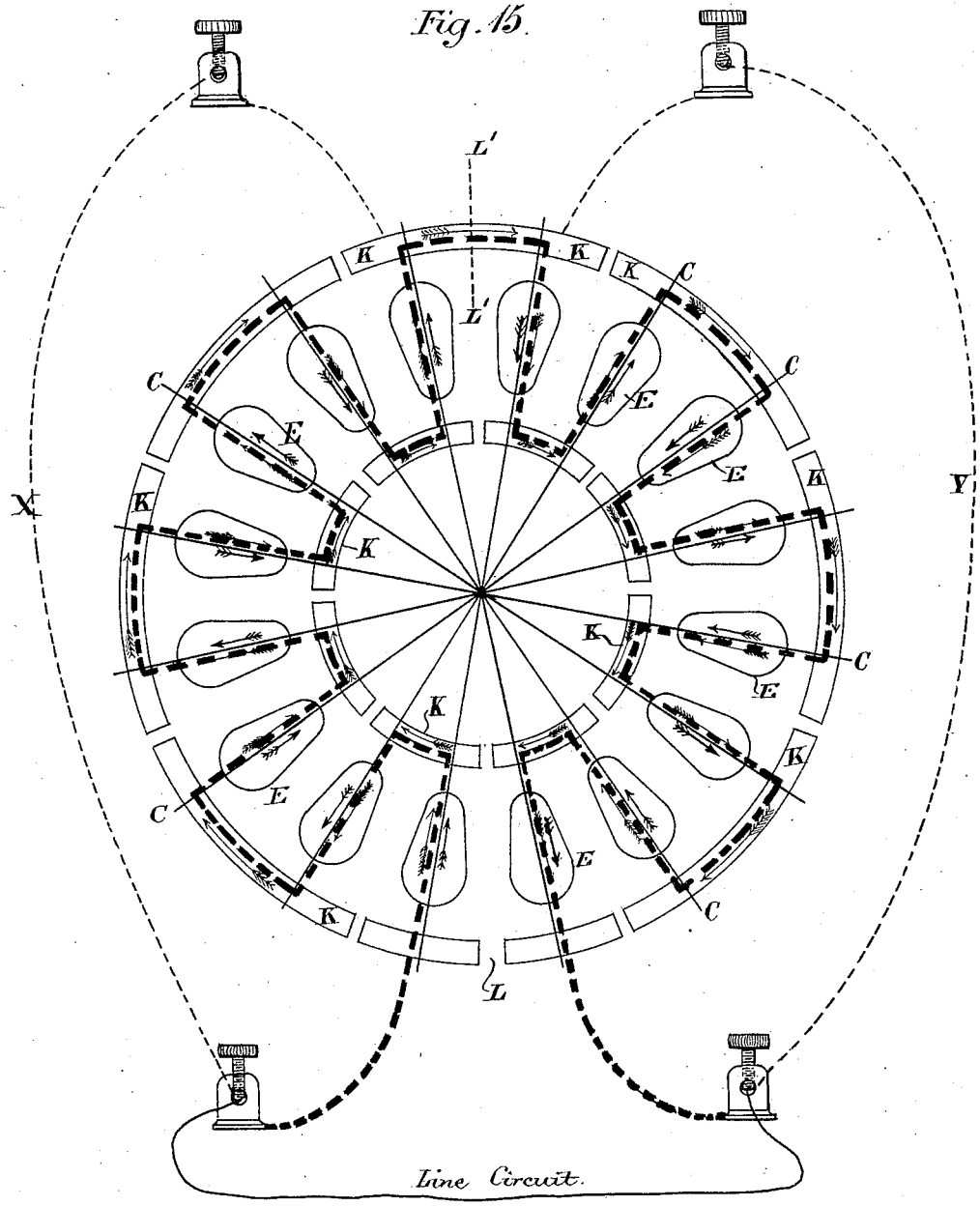

UNITED STATES PATENT OFFICE.

SEBASTIAN ZIANI DE FERRANTI, OF RICHMOND GARDENS, SHEPHERD'S BUSH, AND ALFRED THOMPSON, OF GUILDFORD PLACE, RUSSELL SQUARE COUNTY OF MIDDLESEX, ENGLAND.

DYNAMO-ELECTRIC MACHINE.

SPECIFICATION forming part of Letters Patent No. 282,446, dated July 31, 1883.

Application filed November 22, 1882. (No model.) Patented in England August 17, 1882, No. 3,950.

*To all whom it may concern:*

Be it known that we, SEBASTIAN ZIANI DE FERRANTI, a subject of the Queen of Great Britain, residing at Richmond Gardens, Shepherd's Bush, electrician, and ALFRED THOMPSON, a subject of the Queen of Great Britain, residing at Guildford Place, Russell Square, electrician, both in the county of Middlesex, England, have invented certain new and useful Improvements in Dynamo-Electric Machines or Electric Generators and apparatus connected therewith, (for which we have received Letters Patent in Great Britain, No. 3,950, dated August 17, 1882,) of which the following is a specification.

This invention has for its object improvements in dynamo-machines or electric generators and apparatus connected therewith.

Our invention consists of improvements in dynamo-electric machines which may be employed either for generating currents or converting electricity into mechanical energy.

One of these improvements consists in revolving copper bars in a magnetic field, such bars being fixed radially round the periphery of a revolving disk and insulated from each other and from the body of the machine. The magnetic field would be formed of two sets of magnets fixed round the faces of two disks opposite each other, with the said copper bars revolving between them, and the field-magnets would be so arranged as to present alternately their north and south poles to said insulated copper bars, and so arranged that the north and south poles of the said magnets shall be facing each other on either side of the said copper bars. On revolving the copper bars electricity will be generated therein alternately from and toward the center in traversing successively the magnetic fields round the entire system. In order to collect the electricity so generated into one continuous current, we arrange a series of metallic rubbers or conductors around the outer and inner circumference of the field-magnets, arranging the breaks between the several rubbers or collectors of the outer set to come opposite the center of every other radial space between the field-magnets, and the breaks between the inner rubbers to come opposite the center of the intermediate spaces, the rubbers thus forming a broken conductor, and the break in this conductor being so arranged that the breaks in the outer set of rubbers come opposite the center of the inner rubbers or collectors. The rubbers are kept stationary in their places, and in this way cause the electricity, as the copper bars revolve, to be continuously going onward in one and the same direction. Thus the current would travel in a zigzag direction partly through the revolving metal and partly through the stationary rubbers. In order to take the current from the machine, one of the rubbers will be cut at its center, which center will be over the center of one of the magnets. In order to excite the field-magnets of the machine, the whole current may be passed round them, or, as a shunt to the main circuit, a portion of the main current may be passed round them. The machine may be separately excited from another source, or permanent magnets may be used.

Another portion of our invention consists in the manner in which the said revolving bars are fixed and held in position by making the inner ends of the metallic bars wedge-shaped and pinching them between the grooves of the center wheel, which would be made in two halves bolted together.

Figure 2:
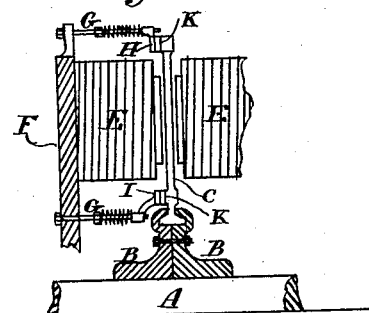
Figure 3:
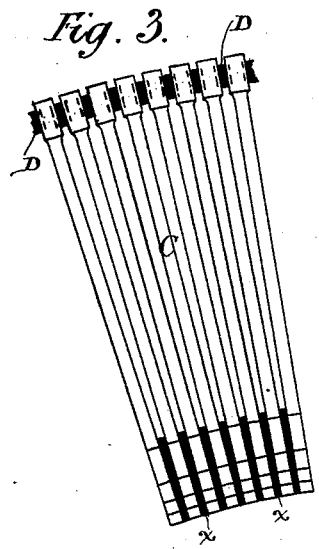
Figure 4:
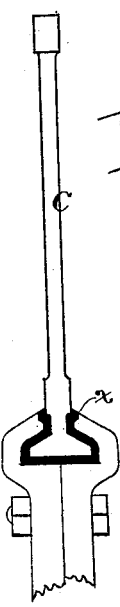
Figure 5:
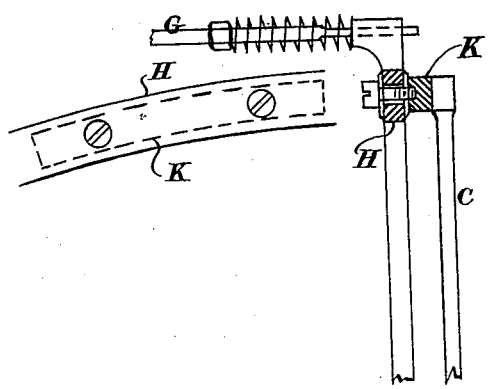
Figure 7:
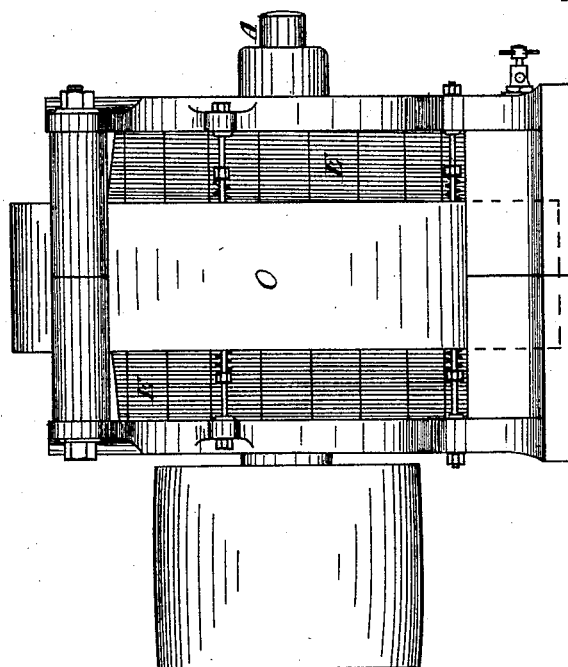
Figure 6:
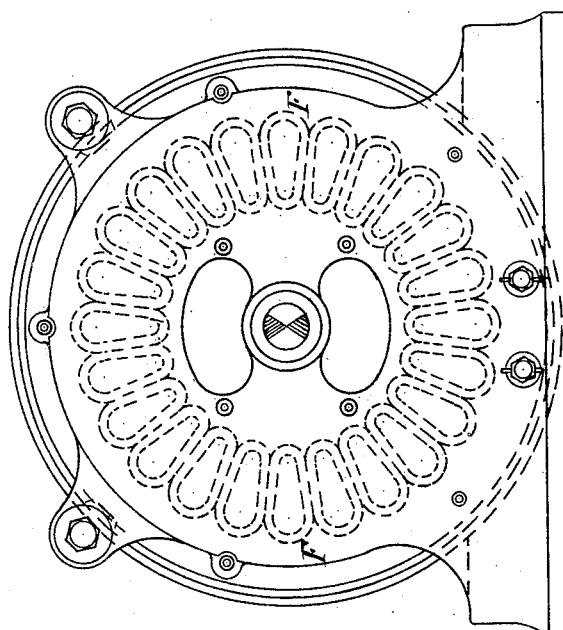
Figure 8:
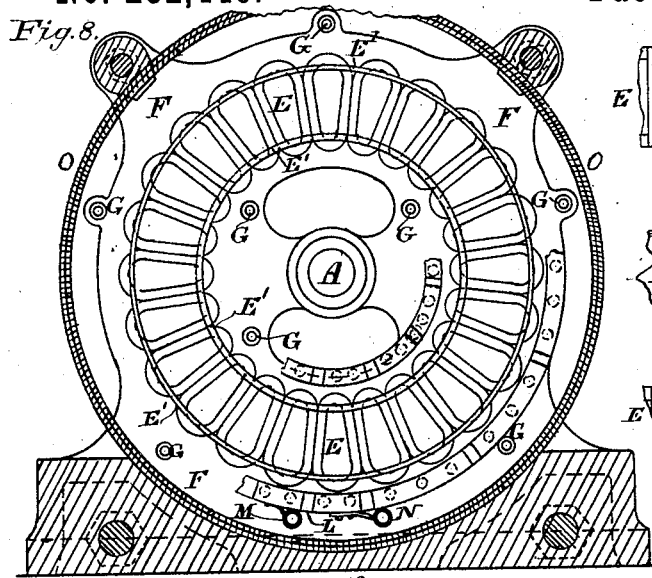
Figure 10:
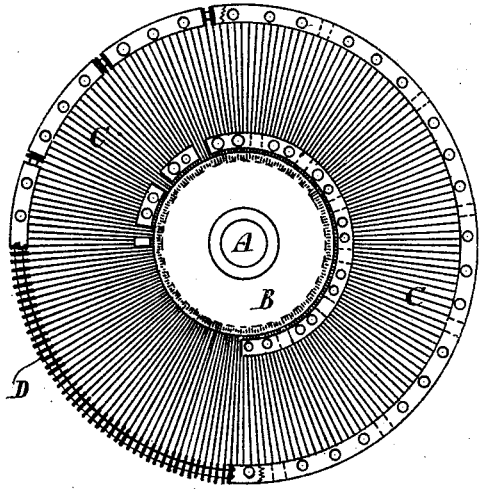
Figures 11, 12:
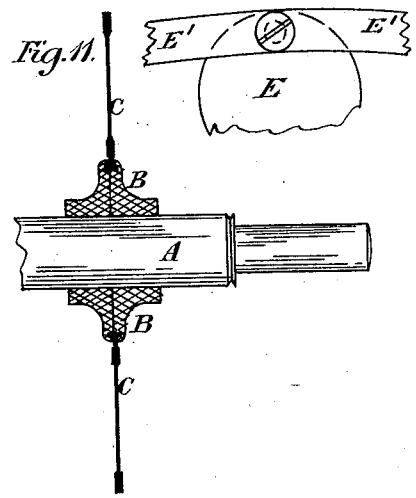
Figure 13:
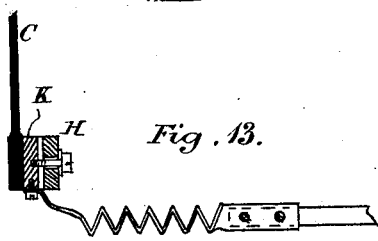
Figure 14:
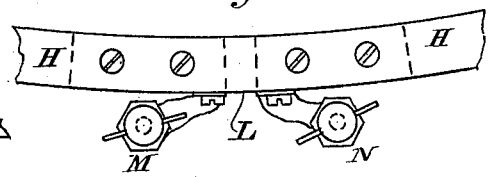

Figure 1 of the drawings annexed shows a side elevation of one-half of a wheel with copper bars radiating out from it and with contact-plates bearing against them, as above described. The position of the field-magnets is also shown. Fig. 2 is a transverse section of the same. Fig. 3 shows a side elevation of some of the bars on a larger scale. Fig. 4 shows another elevation of one of the bars, the side shown in this figure being one of the sides at right angles to the side shown at Fig. 3. This view (Fig. 4) also shows the way in which the inner ends of the bars are secured to the central part of the wheel. Fig. 5 shows, on a larger scale, the way in which the metallic contact-pieces are carried and held up to the radial copper bars. Fig. 6 shows an end view, and Fig. 7 a front view, of the entire machine. Fig. 8 is a transverse vertical section of the same, and Fig. 9 a part longitudinal vertical section. Fig. 10 shows the wheel with the conducting-bars radiating out from it, also part of the two rings carrying the contact-plates, also some of the contact-plates. Fig. 11 is a transverse vertical section of the wheel. Fig. 12 is a face view of part of one of the magnet-poles and of part of one of the guard-rings fixed to it. Figs. 13 and 14 show the way in which the current is led off from one of the rubbers. Fig. 15 is a diagram view to show the zigzag course of the current through the several parts of the armature. A few only of the radial conducting-bars are shown in this figure.

In these figures, A is a revolving axis, carrying the wheel B, formed in two halves bolted together, and clamping between them the inner ends of a number of radial metallic bars, C, preferably of copper. The radial bars might, however, be otherwise carried from the wheel, and, if desired, their outer ends might be secured to a metallic tyer, but insulated therefrom. Between the outer ends of the radial bars are placed distance-pieces D, of non-conducting material. The inner ends of the bars are also insulated from the two halves of the wheel and from one another by insulating material $x$, placed between them, as shown at Figs. 3 and 4. The two halves of the wheel are by preference made of phosphor-bronze. When the bars C have been ranged in a circle around the shaft and the distance-pieces have been put into place between their outer ends, the two halves of the wheel are drawn together so as to make them grasp the inner ends of the bars. The bars are then all drawn inward toward the shaft by the action of inclines on the two parts of the wheel acting against inclines on the inner ends of the bars.

E E are the field-magnets. Their poles are made to be alternately north and south, as above explained, and they are carried by fixed supporting-rings F, which form part of the end frames of the machine.

Figure 9:
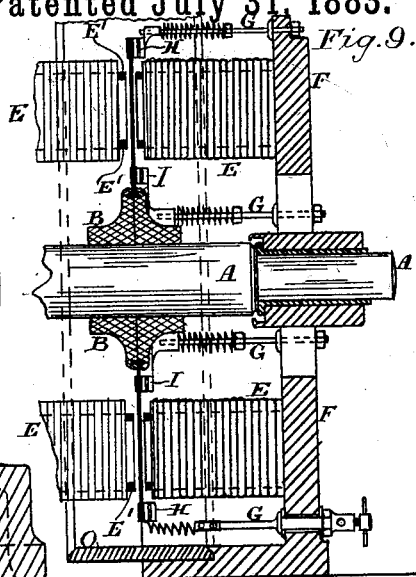

E' E' are guard-rings, of non-magnetic material, fixed to the face of the magnet-poles so as to be flush therewith, as shown at Figs. 8, 9, and 12. One of the end frames F has rods G standing out from it at intervals, one set of rods outside the magnets, the other set on the inner side of the magnets.

H I are two rings, each having lugs projecting out from them. The lugs of the larger ring, H, are free to slide to and fro along the outer set of rods G and the lugs of the smaller ring, I, upon the inner set of rods G. Around the rods are spiral springs, which keep the rings H and I pressed toward the bars C, which radiate out from the revolving wheel. The face of each ring which is toward the radial bars C carries a number of metallic contact-plates, K, which are insulated from the rings and from one another. By the action of the spiral springs they are kept against the radial bars. The breaks between the contact-plates or rubbers carried by the outer ring are, as shown, opposite the center of every other radial space between the field-magnets, while the breaks between the contact-plates or rubbers carried by the inner ring are opposite the centers of the intermediate spaces. The radial bars, with the two sets of contact-plates or rubbers, thus make a continuous zigzag metallic circuit.

If a single current only is to be taken from the machine, one only of the rubbers or contact-plates will be cut through at its center, as shown at L, Figs. 1, 8, and 15, and an insulated conducting-wire will be led from one half of the contact-plate to an insulated terminal, M, and so to the line-wire of the circuit, and, similarly, the other half of the contact-plate will be coupled to another insulated terminal N, for the return-current to complete the circuit; or, if a greater number of circuits is to be taken from the machine, a greater number of contact-plates or rubbers will be cut through, and the currents will then be taken off at one half of each contact-plate so cut through and returned through another of the half contact-plates, which, by the zigzag metallic connections above described, is in electrical contact therewith. Dotted lines X Y in the diagram Fig. 15 show how two circuits may be taken off, one of the contact-plates being not only cut through at L, but another also cut through at the point indicated by the dotted line L'.

The framing of the machine and the electro-magnets carried by it are all constructed as described in another application for patent made by us, and numbered 77,355. The machine is also provided with a fixed guard-ring, O, as is described in that application.

To excite the magnets E, a current is led through their coils from one terminal, M, to the other terminal, N. This circuit, therefore, forms a shunt on the main circuit.

What we claim is—

1. In the construction of the armatures of dynamo-electric machines or electric generators for producing continuous currents, the combination of radial conducting-bars and contact-plates or equivalent contact mechanism, substantially as hereinbefore described.

2. The combination of a number of magnet-poles ranged in a circle with a number of radial conducting-bars carried by an axis and revolved in front of the magnet-poles, and with contact-plates or equivalent contact mechanism by which the outer ends of the radial bars which at any time are in front of two of the adjoining magnet-poles are set in electrical connection with one another, also with other contact-plates or equivalent contact mechanism by which the inner ends of the radial bars which are in front of each of these magnet-poles and of the next succeeding magnet-pole are similarly put in electrical connection with one another, so as to form a zigzag circuit through the several portions of the armature, substantially as described.

3. In the construction of the revolving armatures of dynamo-electric machines, the combination of radial conducting-bars having dovetail feet with a wheel formed in two halves, drawn together by bolts, and with both halves grooved to receive and hold between them the dovetail ends of the radial bars, substantially as described.

SEBASTIAN ZIANI DE FERRANTI.
ALFRED THOMPSON.

Witnesses:
JNO. DEAN,
GEO. J. B. FRANKLIN,
Both of 17 Gracechurch Street, London.